United States Patent [19]

Hese et al.

[11] 4,426,204
[45] Jan. 17, 1984

[54] PROCESS FOR THE MARKING OF CARRIERLESS POLYMERIC MEMBRANES AND ASYMMETRIC CARRIERLESS POLYMERIC MEMBRANE

[75] Inventors: Nils Hese; Alfred Seeling, both of Einbeck; Manfred Weisweiler, Garlebsen, all of Fed. Rep. of Germany

[73] Assignee: Carl Schleicher & Schull GmbH & Co. KG, Einbeck, Fed. Rep. of Germany

[21] Appl. No.: 314,121

[22] Filed: Oct. 23, 1981

[51] Int. Cl.³ .......................... D06P 7/00; C04B 41/16
[52] U.S. Cl. .......................................... 8/492; 264/78; 264/132; 8/518
[58] Field of Search ...................... 8/497, 518; 264/78, 264/132; 428/207

[56] References Cited

U.S. PATENT DOCUMENTS

| | | | |
|---|---|---|---|
| 2,037,898 | 4/1936 | Hansen | 264/78 |
| 2,092,928 | 9/1937 | Moody et al. | 264/132 |
| 2,595,734 | 5/1952 | Toulmin | 264/78 |
| 2,874,416 | 2/1959 | Burnett | 264/132 |
| 2,986,831 | 6/1961 | Terek et al. | 264/132 |
| 3,206,527 | 9/1965 | Murray | 264/132 |
| 3,264,385 | 8/1966 | Reed | 264/132 |
| 3,342,668 | 9/1967 | Dario | 264/132 |
| 3,351,692 | 11/1967 | Purdum et al. | 264/132 |
| 3,924,026 | 12/1975 | Penfield | 264/132 |
| 4,213,926 | 7/1980 | Toyoda et al. | 264/132 |

*Primary Examiner*—Maria Parrish Tungol
*Attorney, Agent, or Firm*—Charles H. Thomas

[57] ABSTRACT

The process for the visible marking of carrierless polymeric membranes for filtration purposes and for the reverse osmosis is characterized in that the marking symbols are first of all printed onto the casting support, onto which subsequently the casting mass is poured which serves for the production of the membrane. During the removing of the pre-solidified, solidified or finished membrane from the casting support, the printing dye which has an outline corresponding to the marking symbols, is taken up by the membrane and is taken along by the latter from the casting support. Preferably, the printing dye which had been imprinted onto the casting support when the membrane casting mass is poured on, has at least dried in a wipe-proof manner and, in this state, is soluble in the solvent-system of the membrane casting mass.

8 Claims, No Drawings

PROCESS FOR THE MARKING OF CARRIERLESS POLYMERIC MEMBRANES AND ASYMMETRIC CARRIERLESS POLYMERIC MEMBRANE

The invention relates to a process for the marking of carrierless polymeric membranes for filtration purposes, namely in particular for microfiltration and for ultrafiltration, as well as for reverse osmosis.

Hereby, the concept "carrierless" indicates that the membrane is not connected in a more or less tight manner with a support structure, for example a filter support, but is superficially and also peripherally unreinforced and unsupported.

The marking of such carrierless polymeric membranes, which frequently have a thickness of only a few micrometers and possess a highly sensitive structure, is extremely problematic. On the one hand, a distinct marking of such membranes is absolutely necessary and, on the other hand, a marking of the highly sensitive carrierless polymeric membranes without destroying the same has not been possible up to now. Thus, for example in cases of membranes which are used for filtration, hence in particular for microfiltration and for ultrafiltration, above all the pore-size has to be indicated, as well as the type of membrane involved, that is to say the raw material from which the membrane is produced. For membranes which display an asymmetric structure and particularly are used for the reverse osmosis, above all the active layer has to be clearly identified, since it is of decisive significance for the execution of a reverse osmosis, that the correct side of such an asymmetric membrane is used. It should be stated that if the active layer of an asymmetric polymeric membrane is not correctly recognized and the membrane is consequently not used in the required manner with its active layer facing the inflow, the membrane will become destroyed when exposed to a compressive load. However, even the skilled technical expert is not in the position to unmistakably identify the active layer of an asymmetric polymeric membrane or the pore size of a filtering membrane without auxiliary means and tests. For the identification of the active layer of an asymetric polymeric membrane one either makes use of dyestuff-adhering-tests or one subjects the membrane samples to drying processes. Within the ranges in which the testing procedures are carried out, the membrane is rendered useless through both procedures. Thereby, particularly in cases of samples which had been taken for the testing of the membrane to be used, one additionally encounters the danger of a renewed mix-up of sides between the membrane sample and the membrane to be used.

Hence, in actual practice, the urgent desire exists for a direct marking of the membrane. However, since the membranes are not only highly sensitive from a mechanical viewpoint and from a chemical point of view are generally stable only on a very selective basis, and moreover have to be absolutely free of foreign material for most purposes of application, obstacles arise in regard to the direct marking of carrierless polymeric membranes, which obstacles have not been overcome up to now. The attempt of directly printing on the polymeric membrane usually fails since the polymeric membrane suffers mechanical damage thereby. Furthermore, the solvents contained in the available printing dyes frequently dissolve the membrane material itself. Moreover, many membranes, in particular the asymmetric membranes destined for the reverse osmosis, have to be continuously kept moist in an aqueous atmosphere in order to prevent impairments of the membrane structure. In addition to the cited difficulties, such membranes are not suited for the water-proof imprinting of marking symbols. Furthermore, the active layer in asymmetric polymeric membranes generally has a maximum thickness of about 1 $\mu$m, hence is subject in an increased measure to a mechanical damage during the printing of the membrane. Consequently, a printing of the membrane can take place at best in the marginal areas which are not needed for the filtration or for the reverse osmosis. However, during the separation processes of such marginal areas prior to placing the membrane into position, the danger again exists of mistaking the sides or mistaking the membranes.

The invention has set itself the task of creating a process for the marking of carrierless polymeric membranes, which process makes possible a marking of the membrane within the surface area utilized by the filtration process or by reverse osmosis, without that the filtering characteristics or the osmotic characteristics of the membrane are adversely affected in any manner whatsoever.

For the solving of this problem, the invention creates a method which comprises the characteristics cited in claim 1.

The invention furthermore creates an asymmetric carrierless polymeric membrane with distinct marking of the active layer.

Hence, the essential feature of the invention is based on the fact that for the marking purposes of a carrierless polymeric membrane, one does not imprint the finished membrane itself, but first of all imprints the support on which the membrane, by pouring or spreading of a casting mass, is produced. This casting mass is always a solution of the membrane-polymer in an organic solvent. This solution can contain fillers. By means of the solvent contained in the membrane-casting-mass, the printing which had been precedingly applied onto the support is dissolved from the support and taken up by the membrane-mass. This then has the result that, during the customary solidification of the membrane through precipitation or drying, the printing dye is taken up into the membrane in form of the outlines imprinted onto the support and, after the formation of the membrane is completed is removed with the same from the casting-support. By using this process, the membrane is clearly and plainly marked in an absolutely non-destructive and chemically stable manner, without affecting the marking-data of the membrane in any way.

In actual practice, the support—onto which the casting mass for the membrane is poured for the production of the membrane and which, according to the invention, is imprinted prior to pouring the casting mass onto said support—preferably consists of a continuous band with a smooth surface, which is made of metal, rubber or of plastics. The support is preferably a continuous band of high grade steel which is polished at its surface.

So as not to influence the formation process of the membrane when the membrane-casting-mass is applied onto the casting support, the printing dye which, in a manner corresponding to the marking symbols, is imprinted onto the support, has to be preferably at least wipe-proof, and in particular has to be preferably completely dry.

Tests have shown that practically any printing dye which is imprinted onto a conventional casting support is transferred into the membrane, when the casting solution is poured onto the imprinted support. However, the cleanest and best results are obtained when, in accordance with an embodiment of the invention, preferably a printing dye is used which is soluble in the solvent or the solvent-mixture, which frequently is also designated as "solvent system", serving as solvent-phase in the membrane-casting-mass. Furthermore, for the execution of the marking process in accordance with the invention, a printing dye is used which, at least after the transfer onto the membrane or within the membrane, is water-proof. Which printing dyes fulfill these conditions is to be either ascertained from the statements of the manufacturer of the printing dyes, or in case of doubt can be readily ascertained by means of a solubility test. Since printing dyes which fulfill this requirement are available on the market in countless compositions, we will forgo listing additional specifications at this place.

The process of the invention can be used in an especially advantageous manner particularly in the case of asymmetric membranes since, during the casting and producing of such asymmetric membranes, the porous inactive spongy layer is formed on the casting support and the active layer is formed at the air-exposed side of the casting layer. Hence, in the course of the marking of asymmetric membranes, the printing dye is taken up in the spongy layer which is inactive for osmotic and filtering purposes. This can be made use of advantageously for the marking of transparent, particularly in cases in which the casting support is imprinted with the marking symbols in a manner correctly identifying the side in question. The inactive layer or the osmotically ineffective bottom side of the asymmetric membrane is than marked in a mirror inverted manner, so that when viewed from the active layer, the marking shines through in a manner correctly identifying the side in question. This type of recognition and readability of the marking symbols can therefore serve for the unequivocal identification of the active layer of the membrane. In cases of nontransparent asymmetric membranes, the imprinting of the casting support takes preferably place in a mirror inverted manner, so that the inactive bottom side of the asymmetric membrane is than imprinted in a manner correctly identifying the side in question. Whereas in the case of transparent or translucent membranes the user of the membranes is to be given the instruction that the active layer lies at the top, when the marking symbols can be read in a manner correctly identifying the side in question, when dealing with non-transparent membranes the user is to be given the instruction that the side of the membrane which is not imprinted represents the active layer. Should the need arise, the required marking symbols are than legible on the imprinted inactive bottom side in a manner correctly identifying the side in question.

Tests have shown that even in cases of a relatively thick application of the printing dye onto the casting support and even in cases of a complete thorough drying of the applied printing dye, the latter is taken up in a completely residue-free manner by the membrane. Consequently, the method according to the invention can be used without further ado for the customary continuous production of membranes, in the case of which continuously revolving steel bands are used as casting support. Thereby, the support is preferably imprinted again directly after the solidified or pre-solidified membrane has been removed from the support, so that the printing dye has at least dried out in a wipe-proof manner by the time the imprinted area on the support has reached the place at which the casting mass is again spread or poured onto the support. In this manner, production compositions and production dates can be imprinted without any problems onto the membranes, which is particularly important for the manufacturer's guarantee.

The marking of the membranes by means of the process in accordance with the invention can take place by using one color but also by using several colors. This, in particular, opens up the possibility of the color coding of the characteristic data of the membrane, such as for example those regarding the membrane material, the pore size or the purpose of application for which the individual membrane in question is specified.

In particular, when using differently colored printing dyes, the solvent-system used for the printing dyes utilized at a given time, can be adjusted in such a manner, in other words the solvent-mixture can be adjusted in such a manner in regard to the concentration of the individual solvents and in regard to the selection of these solvents, that the guarantee is given that all casting dyes imprinted onto the casting support arrive completely dry and wipe-proof underneath the feeding device for the casting mass.

Quantity wise, the cellulose acetate membranes are nowadways probably among the polymeric membranes which are the most frequently used for filtration purposes and for the reverse osmosis. For the imprinting of such cellulose acetate membranes in accordance with the process of the invention, for example printing dyes can be used which contain the customarily used pigments or dyestuffs, in particular carbon black for black colors or dyestuffs on a phthalic acid basis for other colors. As binding agent for such printing dyes, one can use customary binding agents on a polyamide basis, polyacrylate ester or nitrocellulose. As solvents for printing dyes of this type, preferable mixture of ketones are used, for example, mixtures of $C_1$–$C_4$-ketones, whereby the adjustment of the solvent-system will depend on the required drying period. In place of ketones, esters or cyclohexane can be used as solvent. The production of such printing dyes is a familiar process to the technical expert. Furthermore, numerous commercially available printing dyes can not only be used readily for the process of the invention, but can be also adapted with relatively few problems to the special conditions desired in each given case, with this being accomplished by a change of the solvent phase.

We claim:

1. A process for the marking of carrierless polymeric layers in which a casting mass containing an organic solvent and serving for the production of the layer is poured onto a support carrying marking symbols imprinted thereon by means of a printing ink and in which after solidification of the layer, the latter is removed from the support while taking the printing ink along with it, the improvement of said process wherein the printing ink is dried in a wipe-proof manner on a smooth surface of the support at the time the layer casting mass is poured onto the smooth surface of the support, and the layer is a carrierless polymeric membrane for filtration purposes and for reverse osmosis and the support-side of the layer casting mass is the inactive side of the layer.

2. A process according to claim 1 in which the support is a polished endless steel band.

3. A process according to claim 1 in which the dried printing ink is soluble in the solvent of the membrane casting mass.

4. A process according to claim 1 in which when marking transparent membranes the marking symbols are imprinted onto the support in a ture-to-side manner.

5. A process according to claim 1 in which when marking opaque membranes the marking symbols are imprinted onto the support in a mirror-inverted manner.

6. An asymmetric carrierless polymeric membrane for filtration and reverse osmosis purposes carrying printing ink marking symbols applied onto its down-stream side which is inactive in filtration and reverse osmosis, said marking symbols being transferred onto the down-stream side of said membrane during the solidification of the membrane casting mass.

7. An asymmetric carrierless polymeric membrane according to claim 6 which is opaque and carriers said marking symbols in a true to side manner as viewed from the down-stream side.

8. An asymmetric carrierless polymeric membrane according to claim 6 which is transparent and which carries said marking symbols in a mirror-inverted manner as viewed from said down-stream side.

* * * * *